(12) United States Patent
Tobiason

(10) Patent No.: US 8,772,706 B2
(45) Date of Patent: Jul. 8, 2014

(54) MULTIPLE WAVELENGTH CONFIGURATION FOR AN OPTICAL ENCODER READHEAD INCLUDING DUAL OPTICAL PATH REGION WITH AN OPTICAL PATH LENGTH DIFFERENCE

(75) Inventor: Joseph D. Tobiason, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 300 days.

(21) Appl. No.: 13/452,782

(22) Filed: Apr. 20, 2012

(65) Prior Publication Data

US 2013/0277540 A1     Oct. 24, 2013

(51) Int. Cl.
 *G01D 5/34* (2006.01)
(52) U.S. Cl.
 USPC .................................. 250/231.13; 250/237 G
(58) Field of Classification Search
 USPC ................... 250/231.13, 231.16, 237 G, 226;
  341/9–13; 356/498, 499; 385/88–90
 See application file for complete search history.

(56) References Cited

U.S. PATENT DOCUMENTS

| | | | |
|---|---|---|---|
| 5,726,442 A * | 3/1998 | Henshaw | ...................... 250/226 |
| 6,906,315 B2 | 6/2005 | Tobiason | |
| 7,053,362 B2 | 5/2006 | Tobiason | |
| 7,126,696 B2 | 10/2006 | Tobiason | |
| 7,193,204 B2 | 3/2007 | Mitchell | |
| 7,259,863 B2 | 8/2007 | Ishizuka | |
| 7,701,593 B2 | 4/2010 | Holzapfel | |
| 7,973,941 B2 | 7/2011 | Tobiason | |

* cited by examiner

*Primary Examiner* — Que T Le
(74) *Attorney, Agent, or Firm* — Christensen O'Connor Johnson Kindness PLLC

(57) ABSTRACT

A readhead and scale arrangement comprises: a readhead comprising a light source configured to output diverging source light comprising a plurality of individually detected wavelengths and at least a first optical signal receiver channel configured to provide a first set of position signals; and a scale track extending along the measuring axis direction on a scale member comprising a scale grating, the scale track configured to diffract the first diverging source light to provide first and second diffracted scale light portions of each of the individually detected wavelengths to the first optical signal receiver channel which provide interference fringes. The readhead comprises an optical path difference element, arranged such that respective wavelengths undergo different phase shifts. Such an encoder is robust to scale track contamination and other signal degradation.

15 Claims, 5 Drawing Sheets

MULTIPLE WAVELENGTH CONFIGURATION FOR AN OPTICAL ENCODER READHEAD INCLUDING DUAL OPTICAL PATH REGION WITH AN OPTICAL PATH LENGTH DIFFERENCE

FIELD OF THE INVENTION

This invention relates generally to displacement sensing optical encoders, and more particularly to providing an encoder which is robust to scale track contamination.

BACKGROUND OF THE INVENTION

Various scale grating encoders that use optical receiver channels are known, including, for example, those miniature fiber optic encoders disclosed in U.S. Pat. Nos. 6,906,315; 7,053,362; 7,126,696; and 7,973,941 (the '315, '362, '696 and '941 patents), each of which is hereby incorporated herein by reference in its entirety. Such encoders offer a desirable combination of features which may include extremely small size, very high accuracy, electrical noise immunity, and very high-speed operation.

In various applications, it is desirable to use an encoder which is robust to signal degradation resulting from contamination on a scale track. An encoder disclosed in U.S. Pat. No. 7,701,593 (the '593 patent) which is hereby incorporated by reference in its entirety, uses three different wavelengths of source light to determine a position. Each of the three wavelengths is spatially filtered in the readhead using a periodic optical element which acts as three periodically interleaved etalons to provide three distinct spatial phase signals. Such an encoder is robust to contamination or signal drift due to certain thermal effects. However, such a periodic optical element must be manufactured to have very precise separation between the faces of the respective "strip-like" etalons, while at the same time, periodically interleaving the etalons along the measuring axis directions. This requires a very high level of precision in manufacturing such a device. In addition, installation may require a small gap (<100 um). An encoder which is robust to contamination or signal degradation due to thermal effects and is easy to manufacture and install is desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Briefly, the present invention is directed to providing a readhead and scale arrangement usable to provide an indication of a position between two members that move relative to one another along a measuring axis direction, which is robust to scale track contamination, thermal effects, and other signal degradation, and which may be manufactured with relative ease. In various embodiments, the readhead and scale arrangement comprises a readhead comprising a light source configured to output diverging source light comprising a plurality of individually detected wavelengths and at least a first optical signal receiver channel configured to provide a first set of position signals; and a scale track comprising a scale grating extending along the measuring axis direction on a scale member, wherein the scale track is configured to diffract the diverging source light to provide first and second diffracted scale light portions of each of the individually detected wavelengths to the first optical signal receiver channel. The readhead is configured such that the first and second diffracted scale light portions of each individually detected wavelength interfere to provide interference fringes proximate to an input of the first optical receiver channel. The readhead comprises an optical path difference element comprising a first optical path region and a second optical path region wherein the first and second optical path regions have an optical path length difference, and the optical path difference element is arranged such that the first diffracted scale light portion of each of the individually detected wavelengths is derived from source light that passes through the first optical path region and emerges with a first wavelength-dependent phase shift, and the second diffracted scale light portion of each of the individually detected wavelengths is derived from source light that passes through the second optical path region and emerges with a second wavelength-dependent phase shift, such that for each of the individually detected wavelengths, the interference fringes arising from the first and second scale light portions have a different position-independent spatial phase shift that depends on that wavelength and the optical path length difference of the optical path difference element. The input of the first optical signal receiver channel comprises a first spatial filter having a first spatial phase and configured to filter the interference fringes of the individually detected wavelengths such that each member of the first set of position signals comprises a position-dependent periodic signal of one of the individually detected wavelengths, the position-dependent periodic signal having a position-independent phase shift corresponding to the position-independent spatial phase shift of the interference fringes corresponding to that wavelength and the spatial phase of the first spatial filter.

In some embodiments, the first optical path region and the second optical path region may comprise different thicknesses of the same material.

In some embodiments, the first optical path region may comprise a material having a different index of refraction than a material of the second optical path region. In some embodiments, a material of the second optical path region may comprise air.

In some embodiments, a material of the optical path difference element may extend to cover the input of the first optical receiver channel. In some embodiments, the first spatial filter may comprise a periodic phase mask formed on the material that extends to cover the input of the first optical receiver channel.

In some embodiments, the first optical path region may transmit approximately half of the diverging source light and the second optical path region may transmit approximately half of the diverging source light.

In some embodiments, the diverging source light may comprise at least three detected wavelengths.

In some embodiments, the readhead and scale arrangement may comprise a signal detector which includes a wavelength filtering element that separates each wavelength in the first set of position signals in order to provide position signals corresponding to each wavelength.

In some embodiments, the scale grating may be a phase grating.

In some embodiments, the first optical receiver channel may comprise a fiber optic receiver channel.

In some embodiments, the first optical receiver channel may comprise a photodetector. In some embodiments, the photodetector may comprise a photodetector array that is configured as the periodic spatial filter.

In some embodiments, the readhead may comprise a second optical receiver channel and may be configured such that third and fourth diffracted scale light portions of each individually detected wavelength interfere to provide interference fringes proximate to an input of the second optical receiver channel. The third diffracted scale light portion of each of the individually detected wavelengths may be derived from source light that passes through the first optical path region and emerges with the first wavelength-dependent phase shift. The fourth diffracted scale light portion of each of the individually detected wavelengths maybe derived from source light that passes through the second optical path region and emerges with the second wavelength-dependent phase shift such that for each of the individually detected wavelengths, the interference fringes arising from the third and fourth scale light portions have a different position-independent spatial phase shift that depends on that wavelength and the optical path length difference of the optical path difference element. The input of the second optical signal receiver channel may comprise a second spatial filter that is phase shifted relative to the first spatial filter and is configured to filter the interference fringes of the individually detected wavelengths such that each member of the second set of position signals comprises a position-dependent periodic signal of one of the individually detected wavelengths, wherein the position-dependent periodic signal has a position-independent phase shift corresponding to the position-independent spatial phase shift of the interference fringes corresponding to that wavelength and the spatial phase of the second spatial filter.

In some embodiments, the readhead may comprise at least a third optical receiver channel and may be configured such that fifth and sixth diffracted scale light portions of each individually detected wavelength interfere to provide interference fringes proximate to an input of the third optical receiver channel. The fifth diffracted scale light portion of each of the individually detected wavelengths may be derived from source light that passes through the first optical path region and emerges with the first wavelength-dependent phase shift. The sixth diffracted scale light portion of each of the individually detected wavelengths maybe derived from source light that passes through the second optical path region and emerges with the second wavelength-dependent phase shift such that for each of the individually detected wavelengths, the interference fringes arising from the fifth and sixth scale light portions have a different position-independent spatial phase shift that depends on that wavelength and the optical path length difference of the optical path difference element. The input of the third optical signal receiver channel may comprise a third spatial filter that is phase shifted relative to the first and second spatial filters and is configured to filter the interference fringes of the individually detected wavelengths such that each member of the third set of position signals comprises a position-dependent periodic signal of one of the individually detected wavelengths, wherein the position-dependent periodic signal has a position-independent phase shift corresponding to the position-independent spatial phase shift of the interference fringes corresponding to that wavelength and the spatial phase of the third spatial filter.

Regarding the prior art, it should be appreciated that the arrangement disclosed in the '593 patent does not provide interference fringes which have a spatial phase position which is wavelength-dependent. Rather signals of different phases are provided based on detecting the interference fringes of different wavelengths at different "spatial phase" locations along the measuring axis, as determined by the location of the respective etalons that spatially filter the interference fringes of the respective wavelengths. In effect, in the '593 patent, multiple spatial filters are required, and these multiple spatial filters must furthermore be interleaved with one another if they are to receive light from the same regions of the scale in order to provide common mode rejection of certain errors. In contrast, in the readhead and scale arrangement disclosed herein, an optical path difference element is provided having two differing regions configured to alter the relative phase difference between two beams (or portions) of light that are input to the scale, and thereafter interfere to form interference fringes for each wavelength. Thus, the interference fringes of each wavelength of light have a wavelength-dependent spatial phase along the measuring axis based on the relative phase change for that wavelength through the optical path difference element. Thus, it is possible to provide a desired spatial phase relationship between the interference fringes of various wavelengths of light at a single location along the measuring axis. As a result, a single phase mask or spatial filter that provides spatial filtering for the interference fringes of all wavelengths at the same location along the measuring axis direction can provide a set of multiple phase signals derived from light received from the same regions of the scale. This economically provides redundant signals and/or common mode rejection to overcome certain errors (e.g., errors due to localized scale contamination).

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
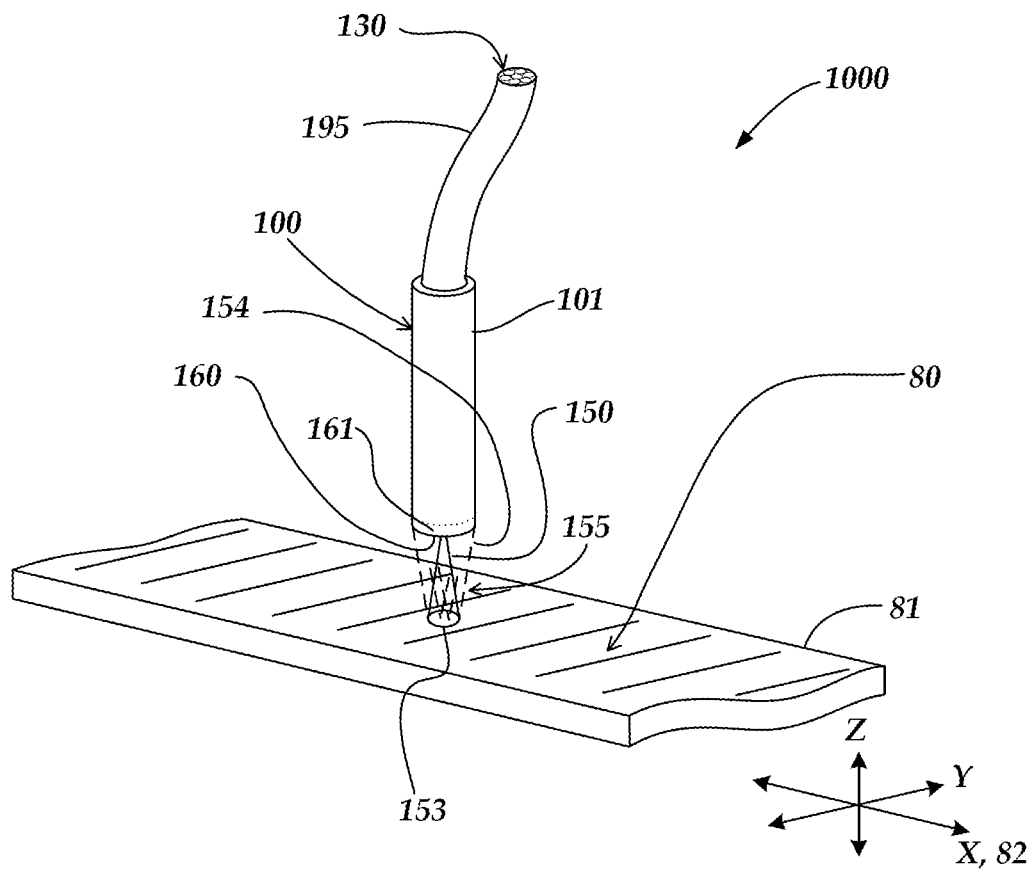
FIG. 1 is an isometric view of a readhead and scale arrangement which employs known interference fringe-generating principles and can be adapted to use an optical path difference element to provide wavelength-dependent phase shifts of interference fringes as disclosed herein.
Figure 2:
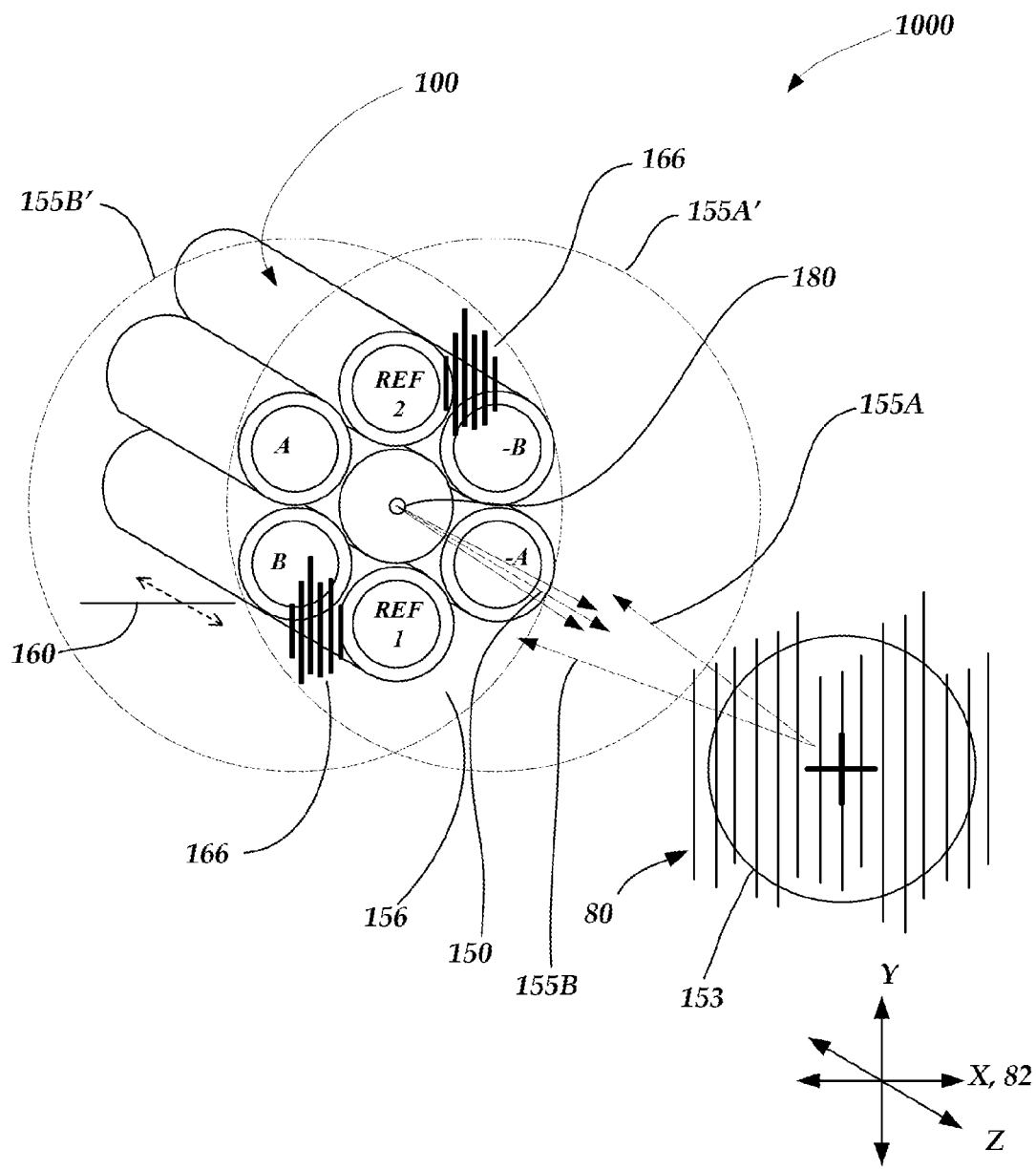
FIG. 2 is an isometric view schematically showing various aspects of the operation of the readhead and scale arrangement of FIG. 1.
Figure 3:
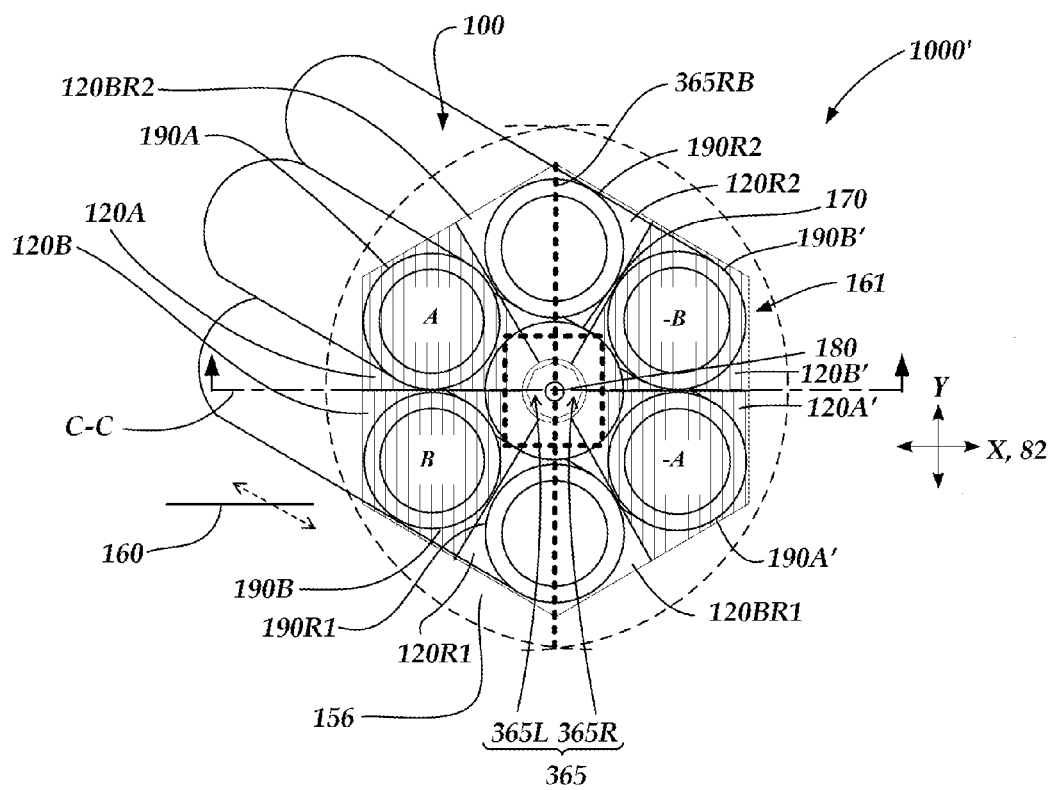
FIG. 3 is an isometric view showing a portion of the readhead and scale arrangement shown in FIGS. 1 and 2, including additional details and an optical path difference element as disclosed herein.

FIGS. 1, 2, and 3 show various aspects of a readhead and scale arrangement which includes known interference fringe-generating principles, and which can be adapted to use an optical path difference element to provide wavelength-dependent phase shifts of the interference fringes as disclosed below in order to provide the benefits outlined above. The description of FIGS. 1, 2, and 3 is provided as a background to provide a context for the description of the novel features and operation provided by an optical path difference element as disclosed herein.

FIG. 1 is an isometric view of a readhead and scale arrangement 1000 which employs known interference fringe-generating principles and can be adapted to use an optical path difference element to provide wavelength-dependent phase shifts of interference fringes as disclosed herein. As shown in FIG. 1, the readhead and scale arrangement 1000 includes a scale member 81 that includes a scale grating 80 and a readhead 100.

An orthogonal XYZ coordinate system may be defined such that the y-axis is parallel to the bars of the scale grating 80, the z-axis is normal to the surface of the scale grating 80, and the x-axis is orthogonal to the y-z plane. A measuring axis 82 is parallel to the x-axis. In operation, the scale member 81 displaces along the measuring axis 82 such that the readhead 100 is displaced along a measuring scale track 86 that includes the scale grating 80. It should be appreciated that a reference mark for absolute position detection may be included along the scale member 81 or an adjacent track with its own readhead, such as that disclosed in the '941 patent. Because this falls outside of the scope of the features described herein, a reference mark or a track containing a reference mark is not shown in the drawings.

In the embodiment shown in FIG. 1, the readhead 100 comprises an interferometric-type readhead, incorporating principles described in detail in the incorporated '696 patent. Briefly, in operation, the readhead 100 outputs a diverging coherent source light 150 from the central one of the optical fibers 130, which illuminates the scale grating 80 at an illumination spot 153, where it is reflected and diffracted to provide scale light 155. In various embodiments, the source light 150 comprises at least two distinct wavelengths of light. In various embodiments, the scale grating 80 is a phase grating configured to suppress zero-order reflection. The scale light 155 comprises primarily +/− first-order diffracted lights that are reflected to the readhead 100. The +/− first-order diffracted lights form a field of interference fringes proximate to a receiver plane 160 of a phase mask element 161. The phase mask element 161 provides a plurality of spatial filters at the receiver plane 160 having different spatial phases over the ends of the outer optical fibers 130 in order to provide a plurality of fiber optic incremental measurement signal receiver channels for each wavelength of light, in a manner analogous to what is described in the '696 patent. As a result of the different spatial phases of the spatial filtering, the respective fiber-optic incremental measurement signal receiver channels may output respective periodic optical signals having respective spatial phases (e.g., quadrature signals) when the scale grating 80 is displaced relative to the readhead 100. The signals output by the signal receiver channels will be discussed in further detail in later figures.

FIGS. 2 and 3 are isometric views schematically showing various aspects of the operation of the readhead and scale arrangement 1000. The view shown in FIG. 2 does not show a phase mask element 161, which is the spatial filtering element of the readhead and scale arrangement 1000, in order to more clearly illustrate other aspects of its operation. The phase mask element 161 is described below with reference to FIG. 3.

FIG. 2 shows certain elements of the integrated readhead and scale arrangement 1000 of FIG. 1, including an integrated readhead optical fiber arrangement 100 (less the phase mask element 161, shown in FIG. 3) operably positioned relative to the scale grating 80 (e.g., on a scale member 81, not shown). Briefly, in operation, the integrated readhead optical fiber arrangement 100 outputs a diverging source light 150 from a light source 180 provided by a central fiber which illuminates the scale grating 80 at the illumination spot 153. In various embodiments, the source light 150 comprises at least two wavelengths of light and is spatially coherent, and even temporally coherent in some embodiments. The scale grating 80 provides reflectively diffracted +/− first-order scale light 155A and 155B, represented by its central rays in FIG. 2. The +/− first-order scale lights 155A and 155B illuminate regions 155A' and 155B', respectively, which overlap in an interference zone 156 to form interference fringes 166 proximate to a receiver plane 160 of the integrated readhead optical fiber arrangement 100. The interference fringes are spatially filtered by the phase mask element 161 (shown in FIG. 3) over the ends of the optical fibers that receive the optical quadrature signals A, A−, B, and B−, according to previously described principles and as described in greater detail below with reference to FIG. 3.

FIG. 3 shows a portion 1000' of the readhead and scale arrangement 1000 shown in FIGS. 1 and 2, including the integrated readhead optical fiber arrangement 100, and a phase mask element 161. In order to more clearly illustrate the phase mask element 161, FIG. 3 does not show the interference fringes 166 in the interference zone 156, but it should be understood that such fringes are present during operation, as previously described. As shown in FIG. 3, the integrated readhead optical fiber arrangement 100 may comprise a central source fiber 170 that provides the light source 180, which may be provided by the end of a single-mode core of the source fiber 170 in some embodiments, and receiver fibers 190A, 190A', 190B, and 190B' (and optionally, 190R1, and 190R2), that provide receiver channels that receive optical signals A, −A, B, −B, REF1, and REF2, respectively, as shown. The signals REF1 and REF2 may be reference mark signals for an absolute encoder, e.g., as described in the '941 patent. The receiver fibers 190R1 and 190R2 are optional, and in various embodiments, dummy fibers may be used in their place. The operation of reference mark signals is not described in detail herein, but may be understood based on the incorporated references. The integrated readhead optical fiber arrangement 100 also includes a phase mask element 161 comprising phase masks 120A, 120B, 120A', 120B', and open aperture masks 120R1 and 120R2.

Briefly, in operation, the phase masks 120A, 120B, 120A', and 120B' are located at the receiving plane 160, and spatially filter the interference fringes in the interference zone 156 to provide quadrature-type periodic incremental measurement signals A, A', B, and B', respectively. In one embodiment, the phase masks 120A, 120B, 120A', and 120B' have relative spatial phases of 0, 90, 180, and 270 degrees, respectively. It will be appreciated that the relative positions of the measurement signals A, A', B, and B', are illustrative only, and not limiting. In general, the phase masks may be configured to provide any desired arrangement for the measurement signals A, A', B, and B'. Various operation and design principles that are relevant to the phase mask element 161, as well as alternative spatial phase arrangements, are described in the incorporated references.

Regarding the signals A, A', B, and B', as previously indicated, the fringes arising from the scale grating 80 are present continuously during the operation of the readhead and scale arrangement 1000 in order to continuously generate these quadrature signals, as outlined above.

Additionally, FIG. 3 shows an optical path difference element 365, comprising a first optical path region 365L and a second optical path region 365R shown in dashed outline, separated by a region boundary 365RB (which has a location illustrated by an arbitrarily extended dashed line). In this embodiment, the optical path regions 365L and 365R each cover approximately half of the light source 180 such that approximately half of the source light output to the scale passes through the first optical path region 365L and approximately half passes through the second optical path region 365R. The first and second optical path regions 365L and 365R provide different optical path lengths for the source light, such that different wavelengths of light included in the source light emerge with different phase shifts from the first and second optical path regions 365L and 365R, as described in greater detail below. The embodiment shown in FIG. 3 is not limiting. For example, in some embodiments, a material of the first optical path region 365L may be extended to cover more of the area to the left of the region boundary 365RB. In some embodiments, it may be extended to cover the receiver fibers 190A, 190B, and their phase masks may be fabricated on the materials. In some embodiments, a material of the second optical path region 365R may be similarly extended and/or used to the right of the region boundary 365RB, including the receiver fibers 190A', 190B'. Various aspects of optical path difference elements are described in greater detail with reference to FIGS. 4 and 5.

Figure 4:
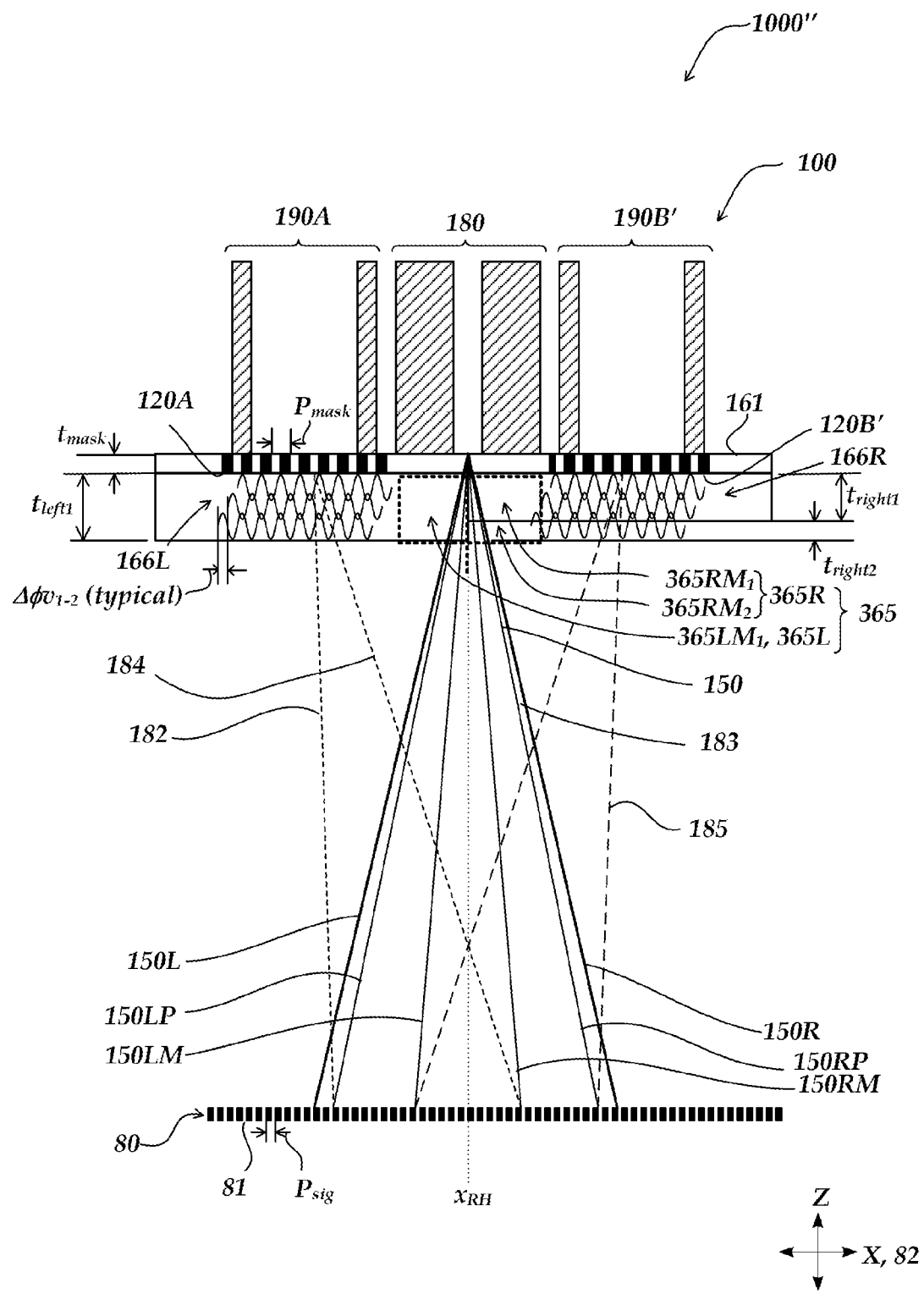
FIG. 4 is a cross section diagram corresponding to the arrangement of FIG. 3, showing various aspects of the operation of the readhead and scale arrangement shown in FIG. 3, including additional details.

FIG. 4 is a diagram including a cross section 1000" along the line C-C of FIG. 3, showing various aspects of the operation of the readhead and scale arrangement 1000 shown in FIG. 3, including additional details. In the embodiment shown in FIG. 4, the first optical path region 365L of the optical path difference element 365 comprises a material 365LM$_1$ having a thickness $t_{left1}$ and an index of refraction $n_{left1}$, and the second optical path region 365R comprises a first material 365RM$_1$ having a thickness $t_{right1}$ and an index of refraction $n_{right1}$, and a second material 365RM$_2$ (consisting of air in this embodiment) having a thickness $t_{right2}$ and an index of refraction $n_{right2}$. We define $t_{right2}$ such that $t_{left1} = t_{right1} + t_{right2}$, and the optical path length difference $\Delta$OPDE between the first optical path region 365L and the second optical path region 365R is given by EQUATION 5, as described in greater detail below.

The readhead and scale arrangement shown in the cross section 1000" is one embodiment usable to provide an indication of a position between two members that move relative to one another along a measuring axis direction (e.g., the measuring axis 82) using an optical path difference element (e.g., element 365) and multiple wavelengths of light to provide one or more sets of multiple phase signals derived from light received from the same regions of the scale. This provides redundant signals and/or common mode rejection to overcome certain errors (e.g., errors due to localized scale contamination).

The readhead and scale arrangement shown in the cross section 1000" comprises a readhead (e.g., the readhead 100) which comprises a light source (the optical fiber light source 180) configured to output diverging source light 150 (shown schematically by limiting rays 150L and 150R) comprising a plurality of individually detected wavelengths and at least a first optical signal receiver channel (e.g., 190A or 190B') configured to provide a first set of position signals; and a scale track comprising a scale grating (e.g., the scale grating 80) extending along the measuring axis direction on a scale member (e.g., the scale member 81). The scale track 80 is configured to diffract the diverging source light 150 to provide first and second diffracted scale light portions (e.g., 183 and 185, or 182 and 184) of each of the individually detected wavelengths to the first optical signal receiver channel (e.g., 190A or 190B'). The readhead is configured such that the first and second diffracted scale light portions (e.g., 183 and 185, or 182 and 184) of each individually detected wavelength interfere to provide interference fringes (e.g., the interference fringes 166L or 166R, represented by periodic intensity variation waveforms in FIG. 4) proximate to an input of an optical receiver channel. For purposes of illustration and understanding, FIG. 4 shows the fringes 166R comprise the interference of example ray 185 which is a + order diffraction of the source light ray 150RP which emerged from the second optical path region 365R and ray 183 which is a − order diffraction of the source light ray 150LM which emerged from the first optical path region 365L. In an analogous manner, the fringes 166L comprise the interference of example ray 184 which is a + order diffraction of the source light ray 150RP which emerged from the second optical path region 365R and ray 182 which is a − order diffraction of the source light ray 150LM which emerged from the first optical path region 365L.

The optical path difference element 365 comprises the previously outlined first optical path region and second optical path region (e.g., the first optical path region 365L and the second optical path difference region 365R) wherein the first and second optical path regions have an optical path length difference, and the optical path difference element is arranged such that the first diffracted scale light portion (e.g., 182 or 183) of each of the individually detected wavelengths is derived from source light that passes through the first optical path region (e.g., 365L) and emerges with a first wavelength-dependent phase shift and the second diffracted scale light portion (e.g., 184 or 185) of each of the individually detected wavelengths is derived from source light that passes through the second optical path region (e.g., 365R) and emerges with a second wavelength-dependent phase shift, such that for each of the individually detected wavelengths the interference fringes (e.g., 166L or 166R) arising from the first and second scale light portions have a different position-independent spatial phase shift $\Delta\phi v_i$ that depends on that wavelength and the optical path length difference of the optical path difference element, as described below with reference to EQUATIONS 3 and 4. The different position-independent spatial phase shift $\Delta\phi v_i$ cause the phase shifts exhibited by different wavelengths to differ by an amount $\Delta\phi v_{1-2}$ as for different wavelengths or frequencies designated 1 and 2, as described below with reference to EQUATION 5. The input of a first optical signal receiver channel (e.g., the receiver fiber 190A or 190B') comprises a first spatial filter (e.g., the phase masks 120A or, 120B') having a first spatial phase and configured to filter the interference fringes of the individually detected wavelengths such that each member of a first set of position signals comprises a position-dependent periodic signal of one of the individually detected wavelengths, the position-dependent periodic signal having a position-independent phase shift corresponding to the position-independent spatial phase shift of the interference fringes corresponding to that wavelength and the spatial phase of the first spatial filter, as outlined below with reference to EQUATION 2. In various embodiments, the readhead and scale arrangement may comprise a single optical signal receiver channel or multiple optical signal receiver channels.

The plurality of individually detected wavelengths may be provided in the source light and detected to provide a corresponding set of signals using various known methods. For example, in one embodiment, a broadband light source may be used with a spectrometer detector. In another embodiment, a plurality of respective wavelengths may be generated by respective diode lasers, LEDs, or the like, and superimposed using dichroic beamsplitters or the like to form a multi-wavelength source light. In some embodiments, such source light may be focused into one end of an optical fiber and output from its other end to provide a suitable light source (e.g., as in the optical fiber light source 180). In either case, the signals of the respective detected wavelengths may be separated and detected by routing the spatially filtered light received by an optical receiver channel to a set of respective wavelength filters and corresponding photodetectors that separate and measure the intensity of the respective wavelengths of light. In other embodiments, the wavelength may be temporally modulated and filtered. One skilled in the art will know these and other applicable methods. For example, the '593 patent teaches various aspects of these known methods in greater detail.

In the embodiment shown in FIG. 4, a material of the optical path difference element 365 extends to cover the input of the optical fiber 190A and the 190B' and may be understood from FIG. 3 to extend to cover the optical fiber 190A' and 190B. However, this is exemplary and not limiting. Because all of the interfering light components of each wavelength pass through any material that is located to cover a receiver channel, such material covering a receiver channel imparts no relative phase shift between the interfering components. Therefore, the materials of the optical path difference element may be localized to the source light in some embodiments, or extended to cover receiver channels in other embodiments. Extending the materials of the optical path difference element may simplify manufacturing and/or assembly, and/or may allow the various phase masks to be economically fabricated on the same material(s) used for the optical path difference element.

This disclosure has typically referred to source light comprising multiple detected wavelengths (meaning any desired detectable wavelength of radiation). One skilled in the art will recognize that wavelengths correspond to frequencies of radiation. The equations below characterize the source light in terms of frequency rather than wavelength, for the sake of mathematical convenience. For each frequency of light, each optical receiver channel for a readhead provides an encoder signal with an amplitude A, an offset C, and a phase $\phi$. This signal varies sinusoidally with respect to the position of the readhead $x_{RH}$ according to the relation:

$$S = A \sin(\phi) + C \quad \text{(Eq. 1)}$$

For each frequency of light $v_i$ (e.g., $v_1$, $v_2$, etc.), the respective spatial phase $\phi v_i$ of the interference fringes received by the phase mask of an optical receiver channel may be represented as:

$$\phi v_i = \frac{2\pi x_{RH}}{p_{sig}} + \frac{2\pi \Delta x_{mask}}{p_{mask}} + \Delta \phi v_i \quad \text{(Eq. 2)}$$

$p_{sig}$ is the pitch of the scale grating 80, $p_{mask}$ is the pitch of a phase mask that receives the interference fringes. The first term depends on the position x of the readhead relative to the scale and is the same for all frequencies. The second term depends on the relative position $\Delta x_{mask}$ of the phase mask corresponding to an optical receiver channel along the measuring axis 82 and is the same for all interference fringes received through that phase mask. The third term $\Delta \phi v_i$ represents a relative spatial phase shift of the interference fringes brought about by creating a desired phase difference between the two interfering components of light of the frequency $v_i$ by using an optical path difference element as disclosed herein. The relative spatial phase shift may be represented by a relation that includes the optical path length difference $\Delta OPDE$ created by the optical path length difference element for the frequency of light $v_i$:

$$\Delta \phi v_i = \frac{2\pi v_i (\Delta OPDE)}{c}. \quad \text{(Eq. 3)}$$

where c refers to the speed of light in a vacuum. The factor $\Delta OPDE$ may be defined according to the relation:

$$\Delta OPDE = \Sigma n_{kleft} t_{kleft} - \Sigma n_{kright} t_{kright} \quad \text{(Eq. 4)}$$

where for each material k in the optical path length difference element, $n_k$ is its index of refraction of that material and $t_k$ is its thickness. The subscript "left" simply refers to the materials in the optical path of the portion light that provides a first one of the interfering components that form the interference fringes, and the subscript "right" simply refers to the materials in the optical path of the portion light that provides the second one of the interfering components that form the interference fringes. It will be appreciated that the descriptions left and right are arbitrary, and not limiting. If we now consider two different frequencies of light, for example, $v_1$ and $v_2$, that follow the same path(s) through the optical path length difference element to the scale and produce interference fringes that are received by the same phase mask, then the first term of EQUATION 2 changes at the same rate for the different frequencies, the second term is the same for each, and the third term provides the respective spatial phase difference of their interference fringes $\Delta \phi v_{1-2}$ created by the shared optical path length difference element, which is a constant phase difference that may be expressed as:

$$\Delta \phi v_{1-2} = 2\pi(v_1 - v_2) \Delta OPDE \quad \text{(Eq. 5)}$$

EQUATIONS 4 and 5 show that for any two detected wavelengths, the thickness of materials or the index of refraction of the materials in the optical path length difference element may be chosen to provide a desired spatial phase difference between their fringes and a corresponding difference between their phases in a set of optical signals received by an optical receiver channel through a shared spatial filter. In one exemplary embodiment, source light may comprise light with wavelengths of 650 nm and 670 nm (i.e., frequencies of 462 THz and 448 THz), and indices of refraction of the left optical path and right optical path may vary by 1.5, for example, representing glass of thickness t in the left optical path and air of the same thickness in the right optical path. According to EQUATIONS 4 and 5, this will therefore require a glass thickness t in the wavelength-dependent optical path difference element which is about 11.4 microns, in order to provide a 90-degree phase shift (e.g., to produce quadrature signals). For a smaller difference in wavelengths, e.g., for a difference of 1 nm, a value of thickness t which is about 211.5 microns will provide a 90 degree phase shift, and so on. Of course, conversely, EQUATIONS 4 and 5 show that for a given optical path length difference in an optical path length difference element, the difference between two detected wavelengths may be chosen to provide a desired spatial phase difference between their fringes and a corresponding difference between their phases in a set of optical signals received by an optical receiver channel through a shared spatial filter.

The embodiment outlined above with reference to FIGS. 3 and 4 is exemplary only, and not limiting. In one embodiment, a readhead configured according to the principles disclosed herein may comprise a single optical receiver channel. Three detected wavelengths of light may be chosen in combination with a particular optical path difference element design such that the interference fringes associated with each detected wavelength have spatial phases which are 120 degrees apart. This will provide the signals for a three-phase encoder using a single phase mask for a receiver channel. In another embodiment, using a subset of the receiver channels shown in FIG. 3, a readhead and scale arrangement may comprise two detected wavelengths of light chosen in combination with a particular optical path difference element design such that the interference fringes associated with each detected wavelength have spatial phases which are 90 degrees apart. This will provide quadrature signals for each of two phase masks corresponding to two receiver channels. The two phase masks may then have spatial phases which differ by 180 degrees, to provide two sets of quadrature signals that are 180 degrees out of phase. Such quadrature signals may be signal processed to compensate for offset and amplitude errors according to known methods. Either of the pair of receiver channels of 190A and 190A' or the pair 190B and 190B', shown in FIG. 3, may be used in such a configuration. Thus, it will be understood that the configuration of FIG. 3 may provide redundant sets of compensated signals, which may be signal processed to eliminate measurement outliers or otherwise provide increased measurement accuracy and/or robustness.

It will be appreciated that with source light comprising three individually detected wavelengths, each of the four optical receiver channels shown in FIG. 3 may provide a complete set of three-phase signals. Thus, it will be understood that the configuration of FIG. 3 may provide four redundant sets of compensated signals, which may be signal processed to eliminate measurement outliers or otherwise provide increased measurement accuracy and/or robustness.

In the embodiment shown in FIG. 4, the mask element 161 comprises a thickness $t_{mask}$. It should be appreciated that the thickness $t_{mask}$ and the thickness $t_{left}$ should be selected such that scale light received by a receiver channel does not pass through an edge of the optical path difference element 365 between the first optical path region 365L and the second optical path difference element 365R. In exemplary embodiments, the light source 180 may output diverging source light which diverges approximately 8 degrees, and the closest edge of a core of the receiver fiber 190A may be located at a distance of approximately 125 microns from the light source 180. In this case, the thickness $t_{mask}$ may be approximately 500 microns, and the thickness $t_{left}$ may be 300 microns. In some embodiments, the thickness $t_{mask}$ is at least 250 microns, and the sum of $t_{mask}$ and $t_{left}$ (or the thickest portion of the optical path difference element 365) is, at most, 1500 microns.

In some embodiments, the mask element 161 is a single glass mask with phase masks for all of the optical receiver channels. In the embodiment shown in FIG. 4, the first optical path region 365L and the second optical path region 365R are placed against the mask element 161. This embodiment is exemplary only and not limiting. As outlined above, in some embodiments, an optical path difference element may comprise a material which is used as a substrate for fabricating the phase mask(s).

As shown in FIG. 4, the first optical path region 365L and the second optical path region 365R are placed symmetrically about the source fiber, and also, the readhead. This embodiment is exemplary and convenient only, not limiting.

In the embodiment shown in FIGS. 2, 3, and 4, the readhead and scale arrangement 1000 comprises receiver fibers used as optical receiver channels. It will be appreciated that other readhead arrangements may use an optical path difference element as disclosed herein. For example, in one embodiment, a readhead may include an optical receiver channel comprising a phase mask followed by a filtering element that separates the respective wavelengths of light, and respective photodetectors arranged to receive each separated wavelength through the filtering element to provide a corresponding signal. In another embodiment, a readhead may include an optical receiver channel comprising adjacent compact photodetector arrays which receive respective portions of the fringe light through respective wavelength filters, wherein the photodetector arrays are structured to provide the spatial filtering function of phase masks. In another embodiment, collimated source light having a plurality of detected wavelengths may be output from a collimating lens through the optical path difference element. The collimating lens, may be supplied with light from an optical fiber, or through conventional optical elements. Such an embodiment is configured such that the collimated light and the optical path difference element are spread over a sufficiently wide field to provide rays analogous to those shown in FIG. 4, and fulfill the principles of operation disclosed herein.

Figure 5:
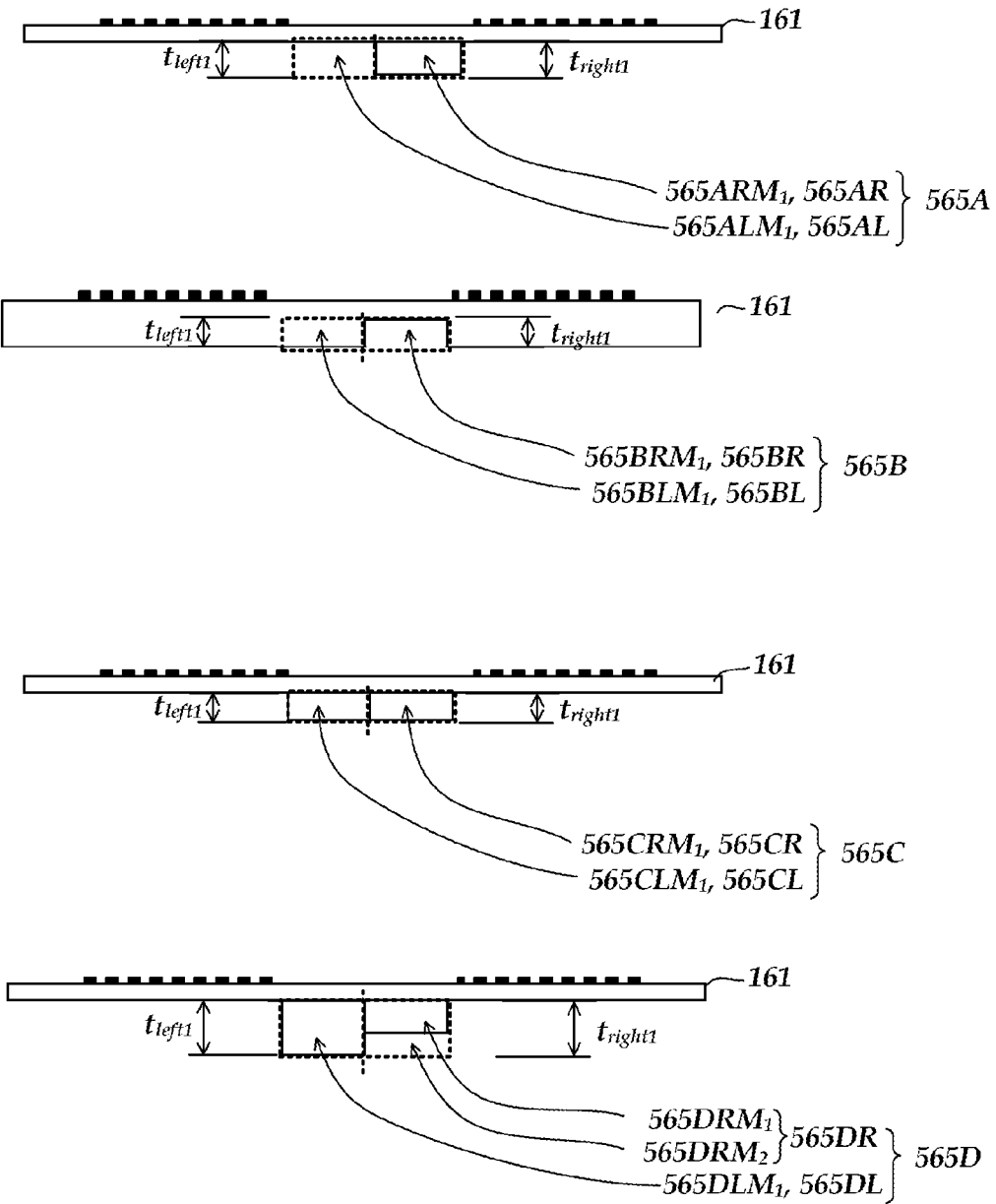
FIG. 5 is a cross section diagram showing several optical path difference element embodiments comprising various combinations of first and second optical path regions, which may be used in various readhead and scale arrangements and operate according to the principles disclosed herein.

FIG. 5 is a cross section diagram showing several optical path difference element embodiments comprising various combinations of first and second optical path regions, which may be used in various readhead and scale arrangements and operate according to the principles disclosed previously.

In an embodiment 565A, the first optical path region 565AL of the optical path difference element 565A comprises a material $565ALM_1$ (consisting of air in this embodiment) having a thickness $t_{left1}$ and an index of refraction $n_{left1}$, and the second optical path region 565AR comprises a material $565ARM_1$ having a thickness $t_{right1}$ and an index of refraction $n_{right1}$. We define $t_{left1}=t_{right1}$, and the optical path length difference $\Delta OPDE$ between the first optical path region 565AL and the second optical path region 565AR is given by EQUATION 5. In this embodiment, the material $565ARM_1$ may be added (e.g., bonded or deposited) onto the mask 161 element. It may be extended to cover the adjacent receiver channel(s) if desired.

In an embodiment 565B, the first optical path region 565BL of the optical path difference element 565B comprises a portion of the mask element 161, which is of its material portion $565BLM_1$ having a thickness $t_{left1}$, and an index of refraction $n_{left1}$. The second optical path region 565BR comprises the air $565BRM_1$ in a removed portion of the mask element having a thickness $t_{right1}$, the air has an index of refraction $n_{right1}$. We define $t_{left1}=t_{right1}$, and the optical path length difference $\Delta OPDE$ between the first optical path region 565BL and the second optical path region 565BR is given by EQUATION 5. In this embodiment, the mask material removed to provide the air space $565BRM_1$ may be removed (e.g., by wet or plasma etching or machining, or the like) from the mask 161 element.

In an embodiment 565C, the first optical path region 565CL of the optical path difference element 565C comprises a material $565CLM_1$ having a thickness $t_{left1}$ and an index of refraction $n_{left1}$, and the second optical path region 565CR comprises a different material $565CRM_1$ having a thickness $t_{right1}$ and a different index of refraction $n_{right1}$. We define $t_{left1}=t_{right1}$, and the optical path length difference $\Delta OPDE$ between the first optical path region 565CL and the second optical path region 565CR is given by EQUATION 5, wherein the difference is provided by the index of refraction difference, not the thickness difference. In this embodiment, the materials $565CLM_1$ and $565CRM_1$ may be added (e.g., bonded or deposited) onto the mask 161 element. Either or both may be extended to cover the adjacent receiver channel(s) if desired.

An embodiment 565D is substantially similar to the embodiment 365 previously shown and described with reference to FIG. 4, except that the materials do not extend to cover the adjacent receiver channels.

It should be appreciated that the arrangements shown in FIG. 5 are exemplary and not limiting. Various other combinations of optical path regions will be apparent to one of ordinary skill in the art based on the teachings of this disclosure, provided that the first diffracted scale light portion of each of the individually detected wavelengths is derived from source light that passes through the first optical path region and emerges with a first wavelength-dependent phase shift and the second diffracted scale light portion of each of the individually detected wavelengths is derived from source light that passes through the second optical path region and emerges with a second wavelength-dependent phase shift, such that for each of the individually detected wavelengths, the interference fringes arising from the first and second scale light portions have a different position-independent spatial phase shift that depends on that wavelength and the optical path length difference of the optical path difference element.

While this invention has been described in conjunction with the exemplary embodiments outlined above, it is evident that the embodiments and design factors described above are indicative of additional alternative embodiments, modifications and variations, as will be apparent to those skilled in the art. Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. A readhead and scale arrangement usable to provide an indication of a position between two members that move relative to one another along a measuring axis direction, the readhead and scale arrangement comprising:
   a readhead comprising a light source configured to output diverging source light comprising a plurality of individually detected wavelengths and at least a first optical signal receiver channel configured to provide a first set of position signals; and
   a scale track comprising a scale grating extending along the measuring axis direction on a scale member, the scale track configured to diffract the diverging source light to provide first and second diffracted scale light portions of each of the individually detected wavelengths to the first optical signal receiver channel,
wherein:
   the readhead is configured such that the first and second diffracted scale light portions of each individually detected wavelength interfere to provide interference fringes proximate to an input of the first optical receiver channel;
   the readhead comprises an optical path difference element comprising a first optical path region and a second optical path region wherein the first and second optical path regions have an optical path length difference, and the optical path difference element is arranged such that the first diffracted scale light portion of each of the individually detected wavelengths is derived from source light that passes through the first optical path region and emerges with a first wavelength-dependent phase shift, and the second diffracted scale light portion of each of the individually detected wavelengths is derived from source light that passes through the second optical path region and emerges with a second wavelength-dependent phase shift, such that for each of the individually detected wavelengths, the interference fringes arising from the first and second scale light portions have a different position-independent spatial phase shift that depends on that wavelength and the optical path length difference of the optical path difference element; and
   the input of the first optical signal receiver channel comprises a first spatial filter having a first spatial phase and configured to filter the interference fringes of the individually detected wavelengths such that each member of the first set of position signals comprises a position-dependent periodic signal of one of the individually detected wavelengths, the position-dependent periodic signal having a position-independent phase shift corresponding to the position-independent spatial phase shift of the interference fringes corresponding to that wavelength and the spatial phase of the first spatial filter.

2. The readhead and scale arrangement of claim 1, wherein the first optical path region and the second optical path region comprise different thicknesses of the same material.

3. The readhead and scale arrangement of claim 1, wherein the first optical path region comprises a material having a different index of refraction than a material of the second optical path region.

4. The readhead and scale arrangement of claim 3, wherein a material of the second optical path region comprises air.

5. The readhead and scale arrangement of claim 1, wherein a material of the optical path difference element extends to cover the input of the first optical receiver channel.

6. The readhead and scale arrangement of claim 5, wherein the first spatial filter comprises a periodic phase mask formed on the material that extends to cover the input of the first optical receiver channel.

7. The readhead and scale arrangement of claim 1, wherein the first optical path region transmits approximately half of the diverging source light, and the second optical path region transmits approximately half of the diverging source light.

8. The readhead and scale arrangement of claim 1, wherein the diverging source light comprises at least three detected wavelengths.

9. The readhead and scale arrangement of claim 1, further comprising a signal detector which includes a wavelength filtering element that separates each wavelength in the first set of position signals in order to provide position signals corresponding to each wavelength.

10. The readhead and scale arrangement of claim 1, wherein the scale grating is a phase grating.

11. The readhead and scale arrangement of claim 1, wherein the first optical receiver channel comprises a fiber optic receiver channel.

12. The readhead and scale arrangement of claim 1, wherein the first optical receiver channel comprises a photodetector.

13. The readhead and scale arrangement of claim 12, wherein the photodetector comprises a photodetector array that is configured as the periodic spatial filter.

14. The readhead and scale arrangement of claim 1, wherein:
   the readhead comprises a second optical receiver channel configured to provide a second set of position signals;
   the scale track diffracts the diverging source light to provide third and fourth diffracted scale light portions of each of the individually detected wavelengths to the second optical signal receiver channel,
wherein:
   the readhead is configured such that the third and fourth diffracted scale light portions of each individually detected wavelength interfere to provide interference fringes proximate to an input of the second optical receiver channel;

the third diffracted scale light portion of each of the individually detected wavelengths is derived from source light that passes through the first optical path region and emerges with the first wavelength-dependent phase shift and the fourth diffracted scale light portion of each of the individually detected wavelengths is derived from source light that passes through the second optical path region and emerges with the second wavelength-dependent phase shift such that for each of the individually detected wavelengths, the interference fringes arising from the third and fourth scale light portions have a different position-independent spatial phase shift that depends on that wavelength and the optical path length difference of the optical path difference element; and the input of the second optical signal receiver channel comprises a second spatial filter that is phase shifted relative to the first spatial filter and is configured to filter the interference fringes of the individually detected wavelengths such that each member of the second set of position signals comprises a position-dependent periodic signal of one of the individually detected wavelengths, the position-dependent periodic signal having a position-independent phase shift corresponding to the position-independent spatial phase shift of the interference fringes corresponding to that wavelength and the spatial phase of the second spatial filter.

15. The readhead and scale arrangement of claim 1, wherein the first spatial filter is formed on material which comprises a thickness of at least 250 microns, and the sum of the thickness of the material of the first spatial filter and a maximum thickness of the optical path difference element is at most 1600 microns.

* * * * *